United States Patent
Gehrmann et al.

(10) Patent No.: US 7,298,840 B2
(45) Date of Patent: Nov. 20, 2007

(54) METHOD AND SYSTEM FOR DATA INTEGRITY PROTECTION

(75) Inventors: Christian Gehrmann, Lund (SE); Rolf Blom, Järfalla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 829 days.

(21) Appl. No.: 10/476,138

(22) PCT Filed: Apr. 9, 2002

(86) PCT No.: PCT/EP02/03931

§ 371 (c)(1),
(2), (4) Date: Oct. 24, 2003

(87) PCT Pub. No.: WO02/091668

PCT Pub. Date: Nov. 14, 2002

(65) Prior Publication Data

US 2004/0123102 A1    Jun. 24, 2004

Related U.S. Application Data

(60) Provisional application No. 60/289,967, filed on May 9, 2001.

(30) Foreign Application Priority Data

May 3, 2001    (EP)    ................................ 01610046

(51) Int. Cl.
*H04K 1/06*    (2006.01)
*H04K 1/04*    (2006.01)

(52) U.S. Cl. ............................ 380/36; 380/37; 380/38; 380/262

(58) Field of Classification Search ............ 380/36–40, 380/262
See application file for complete search history.

(56) References Cited

U.S. PATENT DOCUMENTS 6,851,052 B1*    2/2005    Graveman .................. 713/168
7,039,392 B2*    5/2006    McCorkle et al. .......... 455/411
7,167,984 B2*    1/2007    Graveman .................. 713/168

FOREIGN PATENT DOCUMENTS

WO    WO 01/15382 A1    3/2001

OTHER PUBLICATIONS

Von Bernd Friedrichs, "Authentische und zuverlässige Mobilkommunikation für sicherheitsrelevante Anwendungen Teil I: Sicherheitsanforderungen und grundlegende Verfahren. Authentic and Reliable Mobile Communication for Safety-Related Applications Part I: Security Requirements and Basic Algorithms", Frequenz, Schiele Und Schon GMBH, Berlin, DE, vol. 49, No. ½, Jan./Feb. 1995, (pp. 17-27).

* cited by examiner

*Primary Examiner*—Gilberto Barron, Jr.
*Assistant Examiner*—Venkat Perungavoor
(74) *Attorney, Agent, or Firm*—Michael Cameron (57) ABSTRACT

A method of authenticating a message (111) received via a transmission channel (108) using a Message Authentication Code (MAC). The message comprises a message body (114) and a tag (116) and the method comprises the steps of generating a second tag (115) according to a MAC function (112) on the basis of the received message body and a secret key (113), calculating a distance (117) between the received tag and generated second tag, and comparing (118) the calculated distance with a predetermined threshold value.

15 Claims, 5 Drawing Sheets

METHOD AND SYSTEM FOR DATA INTEGRITY PROTECTION

This patent application claims the benefit of priority from U.S. Provisional Patent Application Ser. No. 60/289,967 filed on May 9, 2001. This application incorporates by reference the entire disclosure of U.S. Provisional Patent Application Ser. No. 60/289,967.

This invention relates to a method and system of authenticating a message received via a transmission channel.

Data integrity and authenticity are fundamental expectations in any secure data communications system, and they comprise an assurance that information has not been modified by someone who is not authorized to do so.

Data integrity may be provided by Message Authentication Codes (MACs). MACs are used for the integrity protection of data communications payload, since they provide a computationally efficient way of protecting large amounts of data.

Examples of applications where MACs are used are streaming data applications. Streaming refers to a technique for transferring data such that it can be processed as a steady and continuous stream. Streaming technologies are becoming increasingly important with the growth of the Internet, because most users do not have fast enough access to downloading large multimedia files quickly. With streaming, the client browser or plug-in can start processing the data before the entire file has been transmitted, e.g. for the display of pictures, animations or videos or the playing of audio presentations. Such multimedia services are also part of the emerging third generation mobile telecommunications services.

MACs are based on a symmetric shared secret between the sender and the receiver. The secret value is called the key. The secret key is an input variable to the MAC calculation. Only somebody who possesses the correct secret key is able to calculate the MAC value for an arbitrary message. A MAC value is an integrity check value that is calculated from and appended to the original message data. Upon receiving a message protected by a MAC, the receiver calculates a MAC check value on the basis of the received data. If the MAC check value is equal to the received integrity check value, the message is accepted as authentic. Examples of known MACs include the so-called Keyed-Hashing for Message Authentication (HMAC) algorithm which is based on cryptographic one-way hash functions such as the secure hash algorithm SHA-1 and the message-digest algorithm MD5. MACs are used to provide data integrity protection in many data communication protocols. Examples of protocols supporting MACs include the IETF TLS, the SSH and the IPSec protocols.

It is a disadvantage of the above prior art methods for data integrity protection that they result in a low throughput in cases where data is carried over a channel with bit errors, e.g. a wireless channel or other noisy channels.

This is a particular disadvantage in situations where real time data or a large amount of data should be transmitted at a high speed over a wireless connection.

It is a further disadvantage of the above prior art methods that the communications performance is sensitive to the bit error rate of the communications channel.

The above and other problems are solved by a method of authenticating data, the method comprising the steps of receiving a message and a corresponding first data item generated according to a first predetermined rule;

generating a second data item according to a second predetermined rule on the basis of the received message;

calculating a first distance between the received first data item and the generated second data item;

comparing the calculated first distance with a predetermined distance value.

Consequently, the calculation of a distance between the data items is introduced, thereby allowing an acceptance of distorted data and, hence, increasing the throughput of the transmission channels while providing a high level of security.

Bit errors during the transmission of the message or the first data item which was calculated on the basis of the original message may cause the calculated second data item to differ from the received first data item. However, according to the invention, if the calculated second data item is sufficiently close to the first data item, the bit errors do not cause the message to be rejected at the receiver even though the calculated second data item differs from the first data item. Therefore, the number of re-transmissions due to bit errors is small. Consequently, it is an advantage of the invention that it increases the throughput of a transmission channel with bit errors.

For an intruder, on the other hand, it is hard to generate a forged message which will result in a second data item closer to the first data item than the predetermined threshold distance. Consequently, it is an advantage of the invention that it provides a high level of security. Preferably, the first and second predetermined rules are secret, i.e. only known to the transmitter and the receiver, respectively, or they are based upon a secret key value, such that the result of the rule is hard to predict without knowledge of the secret key. The use of a secret key has the advantage that the security of the method is ensured and a flexible method is provided, as the predetermined rules may be publicly known and used with a plurality of different keys.

A message may include data packets, streaming data, multimedia data such as video, television broadcast, video on demand, videoconferencing, voice, audio, animations, or graphics data, or other types of data, preferably comprising data where few bit errors do not corrupt the quality or usefulness of the data significantly.

The first and second data items may represent numerical values, character strings, bit sequences or other suitable data formats. The first and second data items will also be called tags in the following. Preferably, the first and second data items are cryptographic digests or other suitable MAC values calculated by a MAC mechanism.

It is a further advantage of the invention that the predetermined distance value, and thus the tolerated distance between the second and the first data item, may be adjusted to the known or expected error rate of a transmission channel. Consequently, an adversary can only change a small number of bits of the order of the bit error rate of the transmission channel.

When the method further comprises the step of processing the message conditioned on a result of the step of comparing the calculated first distance with a predetermined distance value, the received message is only processed when the comparison yields a desired result. Otherwise, the message may be rejected or made subject to further authentication or verification procedures.

In a preferred embodiment of the invention the step of processing the message comprises the step of accepting the message if the calculated first distance is smaller than the predetermined distance value.

The message and the first data item may be received via a transmission channel, e.g. a transmission channel of a communications network, a broadcasting network, a synchronous communications system, an asynchronous communications system, a packet based communications system, or the like.

When the message and the first data item are received via a wireless communications channel, bit errors are likely to occur during transmission and the bit error rate may vary over time according to changes in the transmission quality. Hence, the method according to the invention is particularly advantageous in connection with wireless transmission channels.

The wireless communications may be radio-based communications, e.g. using Bluetooth™ (Bluetooth is a trademark owned by Telefonaktiebolaget LM Ericsson, Sweden), W-CDMA, GSM, CDMA-2000, TCP/IP, WAP or another suitable protocol. Alternatively, the wireless communications may be based on other electromagnetic radiation such as IR, on acoustic signals, or another wireless communications technology.

In contrast to the prior art methods mentioned above, few bit errors are tolerated by the method according to the invention without causing rejection and re-transmission of data packets.

In another preferred embodiment of the invention the step of generating the second data item comprises the step of applying a predetermined permutation to a third data item derived from the message. The third data item may be the received message or a data item which is a result of an initial processing of the received message. According to this embodiment a few bit changes in a binary representation of the message result in a few bit changes in the corresponding second data item, as the permutation only changes the order of bits and not the number of zeros and ones. Correspondingly, the number of bit errors is preserved by a permutation. This property is particularly advantageous in connection with a distance function that depends on the number of bit errors, such as the Hamming distance. Preferably, the permutation is a secret permutation, or it is based on a secret key value, thereby ensuring the security of the method.

When the step of generating the second data item comprises the step of combining a fourth data item derived from the message with a predetermined fifth data item, it is difficult for an intruder to forge a message by a simple bit operation.

In a preferred embodiment of the invention the step of combining a fourth data item derived from the message with a predetermined fifth data item comprises the step of inserting predetermined binary sequences at predetermined positions of the fourth data item. It is an advantage of this embodiment of the invention that an inversion of all bits of a message sequence by an intruder may easily be detected.

The distance may be calculated by any suitable distance calculation function, such as the Hamming distance for bit sequences, the difference between numerical values, etc. Preferably, the distance calculation function implements a distance measure, i.e. a measure of difference with certain mathematical properties of being homogenous, subadditive and positive, thereby providing a distance calculation with properties which may be described mathematically. When the calculated distance is a Hamming distance, the distance depends only on the number of bit errors, it has well-known properties and may be efficiently calculated.

In a preferred embodiment of the invention the method further comprises the steps of a) generating a first sequence of message sections from the message, each message section having a predetermined length;

b) modifying at least a first message section of the sequence of message sections;

c) applying at least a first permutation to at least the modified first message section of the sequence of message sections;

d) calculating at least one XOR sum of a result of at least the first permutation;

e) calculating a hash value from the calculated at least one XOR sum.

It is an advantage of this embodiment of the invention that it provides a low forgery probability and efficiently generates a small tag which may efficiently be transmitted with the message.

It is a further advantage of this embodiment of the invention that it ensures a reliable authentication which makes it difficult for an intruder to forge the message.

Here, the term hash value comprises a data item generated from an input sequence, e.g. a bit sequence, according to a predetermined rule. Preferably, the hash value is smaller than the input sequence and is generated such that it is unlikely that two different input sequences result in the same hash value. Preferably, the hash value is generated by a universal hash function or an almost universal hash function.

When the method further comprises the step of repeating the steps of applying at least one permutation and calculating an XOR sum of the at least one permutation a predetermined number of times, the security of the method according to the invention is particularly high.

In a preferred embodiment of the invention the method further comprises the step of repeating the steps a)-e) with different permutations. It is an advantage of the invention that it results in a small tag value and provides a high level of security.

When the method further comprises the step of encrypting the calculated hash value, additional security is provided.

In another preferred embodiment of the invention the step of calculating the first distance further comprises the steps of dividing the first and second data items into corresponding first and second sets of data sections;

calculating a second distance between a first section of the first set of sections and a corresponding second section of the second set of sections; and comparing the second distance with a predetermined threshold value.

It is an advantage of the method according to the invention that is not sensitive to small bit error rates caused by random transmission errors.

When the first data item is further generated on the basis of a first secret key code, and the step of generating the second data item on the basis of the received message further comprises the step of generating the second data item on the basis of a second secret key code, a high level of forgery protection is achieved. Even with knowledge of the first and second predetermined rules, it is hard for an intruder without knowledge of the first and second secret key codes to generate a forged message. With no knowledge of the secret key code it is hard to generate a forged message which will result in a second data item closer to the first data item than the predetermined threshold distance. Hence, according to this embodiment, the digest calculation of the second data item is based on a cryptographic method, i.e. a method using a secret key as one of the inputs, and the distance between the cryptographic digests are compared. Consequently, a high level of protection is provided in a single operation without the need for further authenticity verification steps.

The first and second key codes may be different key codes or the same key code, and the first and second predetermined rules may be different rules or algorithms or they may be the same rule. Preferably, the first and second key codes are a shared secret of the sender and the recipient of the message. Preferably, the first and second predetermined rules are a MAC mechanism.

The invention further relates to a method of transmitting a message from a transmitter to a receiver via a transmission channel, the method comprising the steps of at the transmitter generating a first data item according to a first predetermined rule on the basis of the message;

transmitting the message and the generated first data item from the transmitter to the receiver;

generating a second data item according to a second predetermined rule on the basis of the received message;

calculating a first distance between the received first data item and the generated second data item;

comparing the calculated first distance with a predetermined distance value.

In a preferred embodiment of the invention, the generated first data item has a size which is smaller than a size of the message.

It is an advantage of the invention that it is efficient and requires little overhead in the data transmission.

In a further preferred embodiment of the invention the step of generating the first data item comprises the step of calculating a hash function on the basis of a sixth data item derived from the message. Hence, the transmitted first data item is smaller than the message.

The invention further relates to a communications system comprising first processing means adapted to calculate a first data item according to a first predetermined rule on the basis of a message;

a transmitter adapted to transmit the message and the generated first data item via a transmission channel;

a receiver adapted to receive the transmitted message and the transmitted first data item;

second processing means adapted to generate a second data item according to a second predetermined rule on the basis of the received message;

to calculate a first distance between the received first data item and the generated second data item; and to compare the calculated first distance with a predetermined distance value.

The invention further relates to an apparatus comprising a receiver adapted to receive a message and a corresponding first data item generated according to a first predetermined rule;

first processing means adapted to generate a second data item according to a second predetermined rule on the basis of the received message;

to calculate a first distance between the received first data item and the generated second data item; and to compare the calculated first distance with a predetermined distance value.

The apparatus may be any electronic equipment or part of such electronic equipment, where the term electronic equipment includes computers, such as stationary and portable PCs, stationary and portable radio communications equipment. The term portable radio communications equipment includes mobile radio terminals such as mobile telephones, pagers, communicators, e.g. electronic organisers, smart phones, PDAs, or the like.

In a preferred embodiment of the invention the apparatus is a mobile radio terminal;

The invention further relates to a data signal embodied in a carrier wave for use in a method described above and in the following, the data signal comprising a message body and a first data item.

The invention further relates to a computer program comprising program code means for performing all the steps of the method described above and in the following when said program is run on a microprocessor.

The invention further relates to a computer program product comprising program code means stored on a computer readable medium for performing the method described above and in the following when said computer program product is run on a microprocessor.

As the advantages of the above aspects of the invention and their respective preferred embodiments correspond to advantages of the method of authenticating a message and its corresponding embodiments described above and in the following, these will not be described again.

The invention will be explained more fully below in connection with preferred embodiments and with reference to the drawings, in which.

The invention will be described in the context of messages represented as binary sequences. However, it is understood that a person skilled in the art will be able to carry out the invention with other message formats, e.g. by transforming the other message format into a binary sequence. Examples of other message formats include e.g. plain text, byte representations, hex-values, octal-values, MP3, MPEG, JPEG, TIFF, etc.

Figure 1:
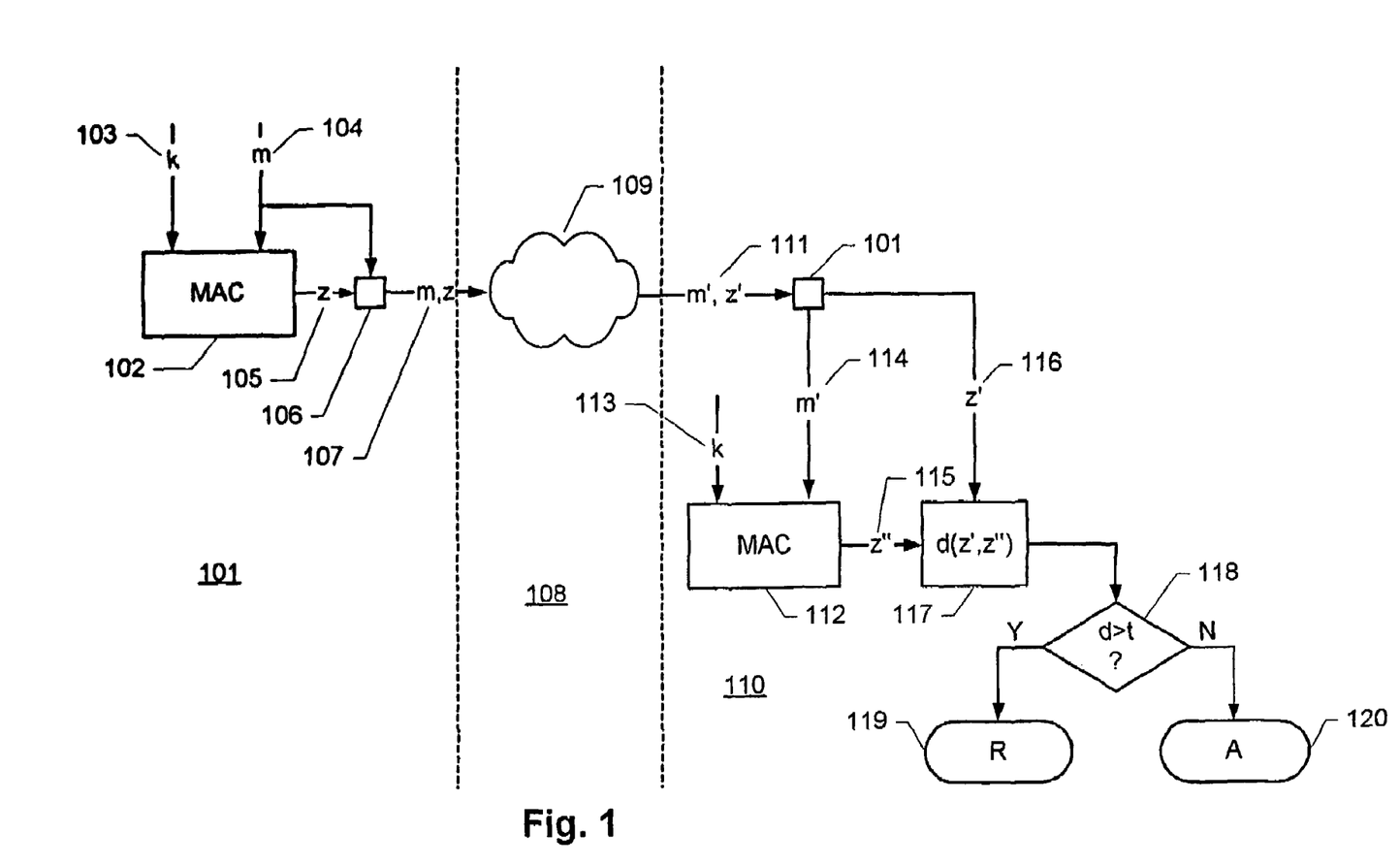
FIG. 1 shows a flow diagram of a method according to a first embodiment of the invention.

FIG. 1 shows a flow diagram of a method according to a first embodiment of the invention where integrity protection is provided to a message m 104 during the transmission of the message from a transmitting side 101 via a transmission channel 108 to a receiving side 110.

At the transmitting side 101 a MAC value z 105 is calculated using a MAC function 102. The MAC function takes the message m and a secret key k 103 as inputs. The MAC value z 105 is combined with the original message m 104 by a concatenation function 106 or a combining circuit. The resulting combined message 107 is sent to the receiving side 110 via a transmission channel 108. During the transmission, there is a risk of the message 107 being altered by an unknown process 109. The alterations may be caused by transmission errors, or they may be due to modifications of the message by, for example, an unauthorised intruder. At the receiving side 110, the received message m' 114 and the received MAC value z' 116 are extracted from the received combined message 111 by an extraction function 101 or an extraction circuit. On the basis of the received message m' 114 and the secret key k 113, a MAC value z" is calculated using the MAC function 112. Preferably, the MAC function 112 implements the same algorithm as the MAC function 102 used at the transmitting side, and the secret key k 113 is the same key as the secret key 103 used for calculating the original MAC value z 105. According to the invention, a distance d(z',z") between the received MAC value z' 116 and the calculated value z" 115 is calculated by a distance calculation function 117 which is based on a distance function d(·,·). In a subsequent step 118 the calculated distance d is compared to a predetermined threshold t. If the distance d is larger than the threshold t, the message is rejected in step 119, otherwise the message is accepted in step 120.

When using a prior art MAC method, a single error in a data packet will result in an incorrect MAC value, and the receiver will not accept the packet. As a result, the data needs to be retransmitted, irrespective of whether the bit error results from a transmission error or a change caused by an intruder. Hence, MAC protection over a channel with a high bit error rate results in a bad throughput. The MAC method according to the invention allows an adversary to change some information in a data stream. However, an adversary is not able to change more than a small amount of the information. When transmitting data with a lot of information, this is not beneficial for an adversary. On the other hand, when transmitting streaming data over a channel with errors, the method according to the invention considerably increases the throughput compared to prior art MACs.

Figure 2:
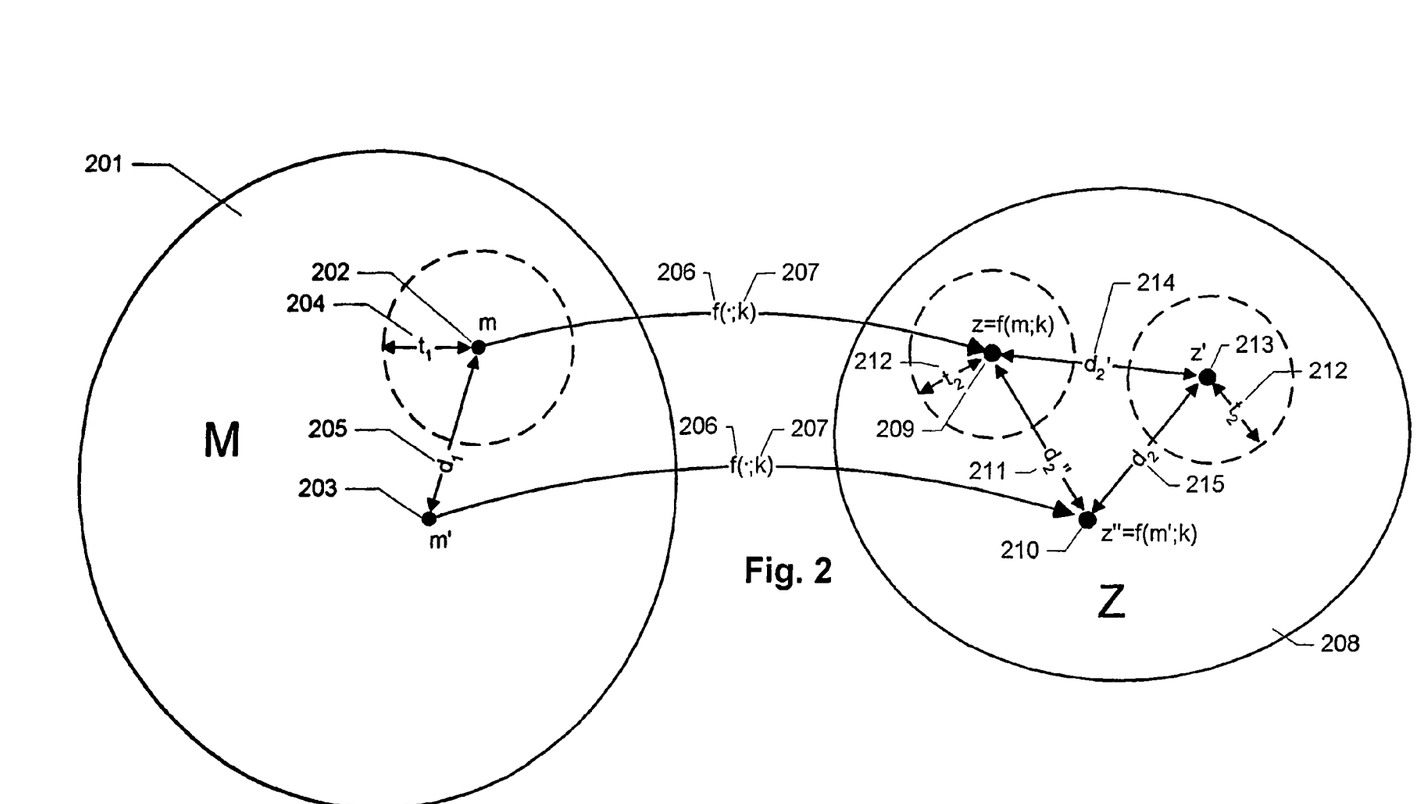
FIG. 2 shows a schematic view of a mapping according to an embodiment of the invention.

FIG. 2 shows a schematic view of a mapping according to an embodiment of the invention. In general, a MAC is a function f 206 which is a mapping from a message space M 201 to a tag space Z. The function is parameterised by a key k 207 from a key space K (not shown), i.e. the exact mapping is determined by a second input parameter 207 to f, called the secret key k, such that for any k∈K, m∈M, ∃ f(m;k)=z, where z∈Z. For example, given a value of k, the message m 202 is mapped to the tag z=f(m;k) 209 and the message m2 203 is mapped to the tag z2=f(m2;k). Preferably, the cardinality of Z is less than the cardinality of M in order to keep the tag size, and, consequently, the required transmission overhead for transmitting the tag is small.

A disadvantage of the prior art MAC methods is that a message is rejected, if the calculated tag value differs from the received tag value, irrespective of how much the received message differs from the original message.

For a MAC according to the invention, also called a streaming MAC in the following, a distance function d(·,·) is defined on the tag space Z 208. Furthermore, let D(·,·) be a distance function defined on the message space M 201, and let $t_1$ 204 and $t_2$ 212 be predetermined threshold values. Preferably, the function f is defined such that for an intruder with knowledge of m 202 but without information about the value of k 207 it is hard to find a message m' 203 in M with a distance d1=D(m,m') 205 to the original message m 202, such that d1>$t_1$, and with a distance $d_2$"=d(z,z") 211 between the corresponding tags which is smaller than $t_2$ 212. Furthermore, the function f is preferably defined such that it is hard for an intruder with knowledge of m 202 but without information about the value of k 207 to predict a value z' 213 in Z such that the distance $d_2$' 214 between z' and the correct tag z 209 is smaller than the threshold $t_2$ 212, i.e. $d_2$'=d(f(m;k),z')<$t_2$.

Hence, the steps of a method according to an embodiment of the invention may be summarised as follows:

Step 1: The transmitter and the receiver in a communications system share a secret value k 207. They may further agree on a distance function d and a threshold $t_2$ 212.

Step 2: For a message m 202 to be sent from the transmitter to the receiver a tag value z=f(m;k) 209 is calculated at the transmitter.

Step 3: The message m 202 and the tag z 209 are sent from the transmitter to the receiver via a communications channel.

Step 4: The receiver receives a message m' 203 and a tag z' 213.

Step 5: The receiver calculates z' f(m';k) 210.

Step 6: The receiver calculates the distance $d_2$ d(z',z") 215 and compares the calculated distance with the threshold $t_2$ 212.

Step 7: The receiver accepts the message m' 203 if and only if $t_2 \geq d_2$.

Once a MAC function and a key is agreed upon, steps 2 through 7 may be repeated for a plurality of messages using the same function and the same key.

In case of acceptance, the message may be further processed at the receiver. In case of rejection of a message a request for re-transmission may be sent from the receiver to the transmitter or other measures may be taken, such as informing a user, generating an event, sending a notification to the transmitter, or the like.

Figure 3A:
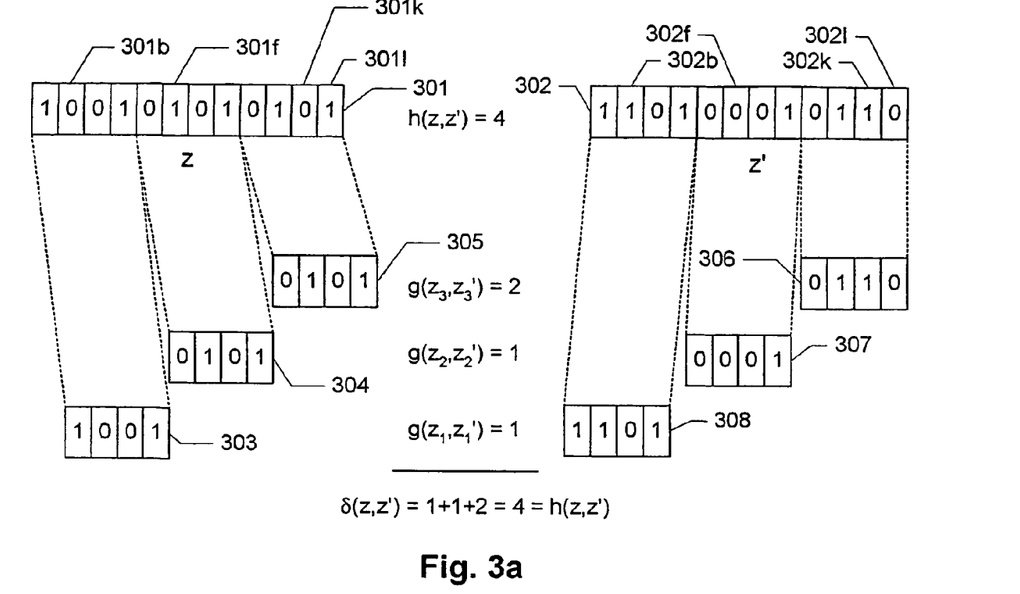
FIGS. 3a-b illustrate the difference between examples of distance functions according to embodiments of the invention.
Figure 3B:
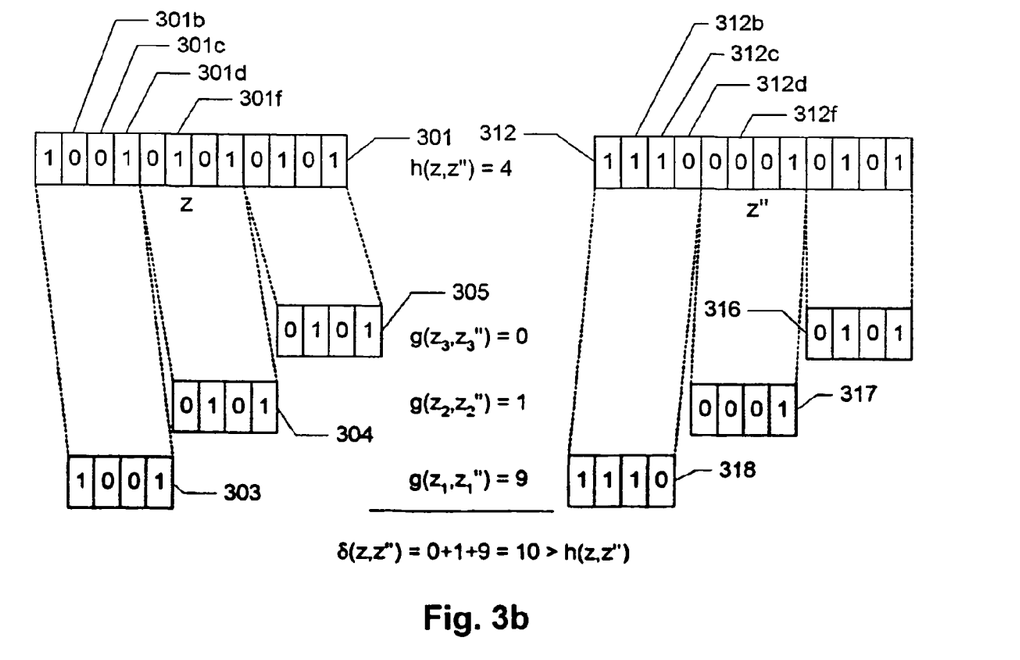

Now referring to FIGS. 3a-b, a preferred distance function on the messages is the Hamming distance. However, other distance functions may be used. The Hamming distance between two tuples is defined as the number of positions in which their components differ. For example, the Hamming distance between the binary tuples (0,0,1,1,1) and (1,1,0,0,1) is equal to four. In the following the Hamming distance between the message m and the message m' will be denoted h(m,m'). More formally, h may be defined as $$h(m, m') = \sum_{1 \leq i \leq L} F(m_i, m'_i),$$

where m and m' are bit sequences of length L, $m_i$ is the i-th bit in m, $m'_i$ is the i-th bit in m', and the function F is defined as $$F(x, y) = \begin{cases} 1, & \text{if } x \neq y \\ 0, & \text{otherwise} \end{cases}.$$

In a transmission channel error model, the Hamming distance between the sent and received messages corresponds to the number of errors during transmission. In general, a MAC according to the invention should, preferably, have the property that a message is accepted, if the distance between the sent and received message sequences is small. For example, if only a few errors occur during transmission, the receiver should still accept the message.

Now consider a message m sent by the transmitter and the message m' received by the receiver. Preferably, a MAC method according to the invention is constructed such that all messages with h(m,m')≤$t_1$ are always accepted, i.e., if not more than $t_1$ errors occur or somebody alters not more than $t_1$ bits during transmission, the message is accepted.

In the tag space Z, the Hamming distance may also be used as a distance function. Alternatively, different distance functions may be used. Now referring to FIG. 3a, a distance function δ(·,·) according to an embodiment of the invention will be described. According to this embodiment of the invention, an arbitrary tag value 301 z∈Z is divided into y different blocks 303-305, preferably of equal size L, such that $z=z_1, z_2, z_3, \ldots, z_y$. In the examples of FIGS. 3a-b y=3 and L=4. For a given threshold $t_2$, a distance function δ on elements in Z is defined as: $\forall$ z, Z'∈Z, $$\delta(z, z') = \sum_{i=1}^{y} g(h(z_i, z'_i)),$$

where h is the Hamming distance and g is the function:

$$g(x) = \begin{cases} x & \text{if } x < t_2 \\ y \cdot t_2 & \text{if } x \geq t_2 \end{cases}.$$

According to this embodiment, a received message-tag pair, m',z', is accepted if and only if $\delta(z',z'')<y \cdot t_2$, where z''=f(m';k). In the examples of FIGS. 3a-b the threshold is $t_2=3$.

Hence, a message is rejected, if the Hamming distance between at least one of the pairs of blocks is larger than a predetermined threshold $t_2$. If, on the other hand, the Hamming distances between all pairs of blocks are smaller than $t_2$, the message is accepted. Compared to the Hamming distance, this distance function is less sensitive to bit errors which are randomly distributed over the tag value. This is illustrated by FIGS. 3a-b. In FIG. 3a two tag values z 301 and z' 302 are shown with a Hamming distance of h(z,z')=4. The bit positions 301b, 301f, 301k, 301l and 302b, 302f, 302k, 302l, respectively, where the two tags differ are spread over the entire sequence. Assuming a threshold $t_2=3$, the distance according to the distance function δ described above yields four, as the Hamming distance in none of the blocks exceeds the threshold $t_2$. The blocks 303 and 308 differ by one bit, hence $g(z_1, z_1')=1$. The blocks 304 and 307 differ by one bit, hence $g(z_2, z_2')=1$. The blocks 305 and 306 differ by two bits, hence $g(z_3, z_3')=2$. In FIG. 3b, the bit sequences z 301 and z' 312 have the same Hamming distance 4 as in the example of FIG. 3a. However, now the bit positions 301b, 301c, 301d, 301f and 312b, 312c, 312d, 312f, where the tags differ are clustered in the beginning of the sequences and, correspondingly, the distance function 6 yields a difference of 10: The blocks 303 and 318 differ by three bits, hence $g(z_1, z_1')=y*t_2=9$, as $t_2 \leq 3$. The blocks 304 and 317 differ by one bit, hence $g(z_2, z_2')=1$. The blocks 305 and 316 do not differ, hence $g(z_3, z_3')=0$.

It is an advantage of this distance function that it provides an efficient and secure authentication. In particular, in a construction where the different blocks of the tag value correspond to predetermined blocks of the respective messages, an authentication method is achieved which is more sensitive to localised errors than to randomly distributed bit errors.

It is understood that a corresponding construction may be defined for blocks of different length, e.g. in the case where the length of the message m is not an integer multiple of y. Alternatively, the message or one of the blocks may be padded, e.g. with zeros.

Figure 4:
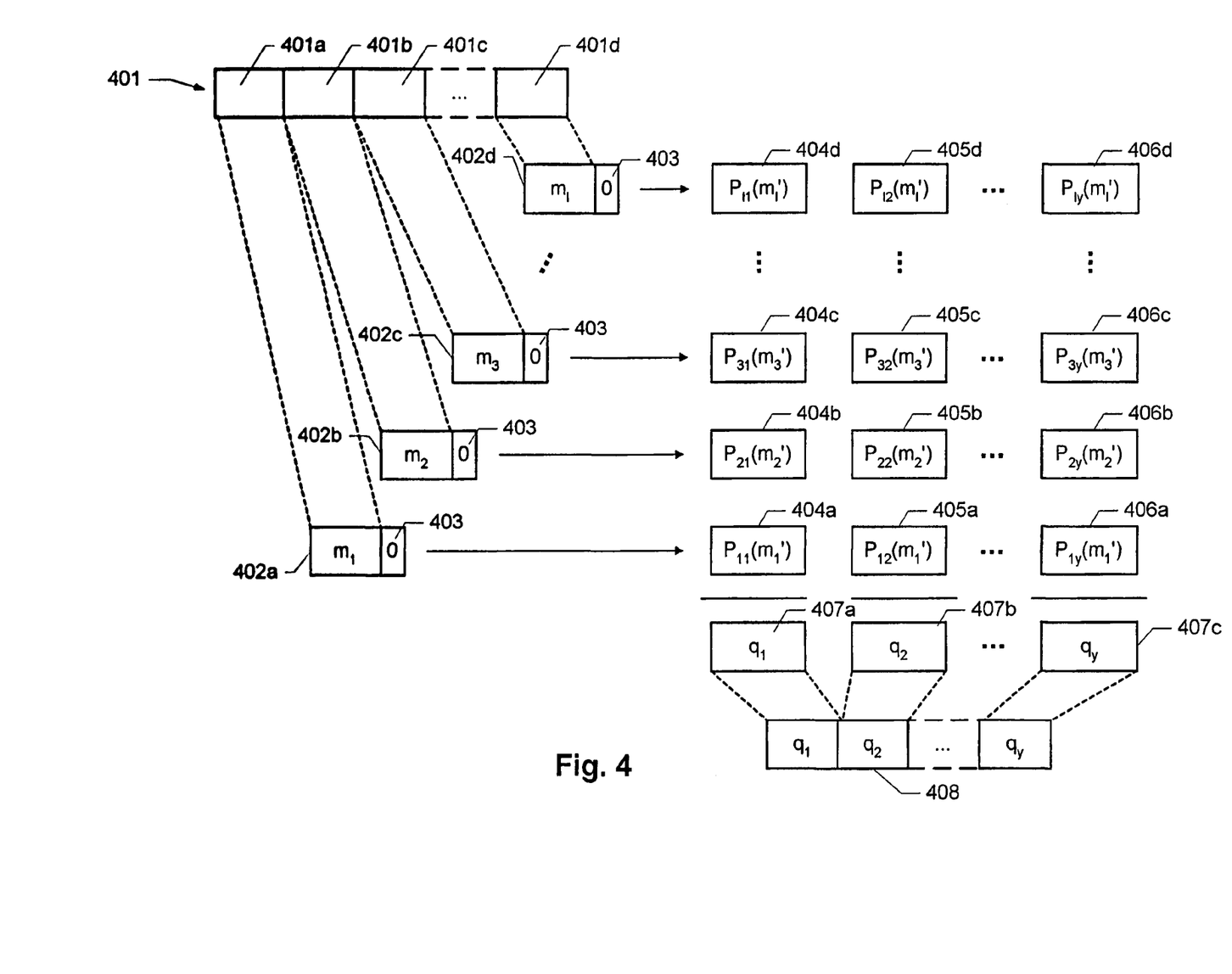
FIG. 4 shows a schematic view of a method according to a second embodiment of the invention.

FIG. 4 shows a schematic view of a method according to a second embodiment of the invention. The method according to this embodiment utilises three insights described in the following:

A MAC according to the invention should have the property that a small distance between messages will result in a small distance between the corresponding tags. A natural measure to use considering channel errors, is the Hamming distance. If the distance function according to the invention is based on the Hamming distance, the MAC algorithm should have the property that a few bit changes on a message will result in few bit changes in the corresponding tag. A mapping that has this property is a permutation. A permutation only changes the order of the bits in a sequence, but preserves the number of zeros and ones in the sequence. If two different binary sequences differ in, for example, n positions before a fixed permutation is applied on the sequences, the sequences will also differ in n positions after the permutation is applied.

Secondly, considering a message sequences m $m_1$, $m_2, \ldots, m_n$, and applying a random permutation P on this sequence, we denote the output sequence by $q=q_1, q_2, \ldots, q_n$, i.e., q=P(m). Denote by In(m) the inverse of the sequence m, i.e., the sequence m with each bit flipped. Clearly, P(In(m))=In(P(m)). Hence, if only a permutation is used as the basis for a streaming MAC construction, it will be easy for an adversary to forge a message by simply flipping all bits in the message and in the corresponding message tag. This may be avoided by adding a fixed binary sequence to the message sequence before the permutation.

Thirdly, applying a permutation on a bit sequence results in a new bit sequence with the same length as the original sequence. Preferably a construction of an efficient MAC includes the use of a function that has an image that is much smaller than the function pre-image. Such a function is called a hash function and its image a hash value. A hash may be constructed by dividing the message into blocks of equal size, applying a function with the desired cryptographic properties on each block, and then sum together all the different outputs, for example using a XOR function. The XOR function of a sequence of bits may be defined as follows: Consider two binary sequences of length L: $b_1=b_{11}, b_{12}, \ldots, b_{1L}$ and $b_2=b_{21}, b_{22}, \ldots, b_{2L}$. The XOR sum, $b_1 \oplus b_2$ of the two sequences equals $b_{11} \oplus b_{21}, b_{12} \oplus b_{22}, \ldots, b_{1L} \oplus b_{2L}$, i.e. the XOR is performed bitwise. Now, consider two binary message sequences of length 2L, $m=m_1, m_2=m_{11}, m_{12}, \ldots m_{1L}, m_{21}, m_{22}, \ldots m_{2L}$ and $m'=m'_1, m'_2=m'_{11}, m'_{12}, \ldots m'_{1L}, m'_{21}, m_{22}, \ldots m'_{2L}$. Assume that the Hamming distance between the messages is h(m,m')=k. Then, it follows that $h(m_1 \oplus m_2, m'_1 \oplus m'_2) \leq k$, which is a desired property for MAC according to the invention. The above relation follows from the fact that for binary values $b_1, b'_1, b_2$ and $b'_2$, the inequality $b_1 \oplus b_2 \neq b'_1 \oplus b'_2$ is valid, if and only if $b_1 \neq b'_1$ and $b_2=b'_2$ or $b_1=b'_1$ and $b_2 \neq b'_2$.

Now referring to FIG. 4, a streaming MAC method according to an embodiment of the invention comprises the following steps:

Step 1: A message m 401 is divided into message blocks 401a-401d, i.e. $m=m_1, m_2, \ldots, m_l$. Each message block has a predetermined size. Preferably, all message blocks have the same size. In this case, if the message length is not a multiple of 1, a fixed sequence may be appended so that the new message sequence becomes a multiple of 1.

Step 2: Modify the message block sequence by inserting some fixed bits at predetermined positions of each message block, for example by appending a predetermined bit sequence. In the example of FIG. 4, the same bit sequence 403, labelled 0 in FIG. 4, is added to all blocks, resulting in the new message blocks 402a-402d.

Step 3: Apply different permutations on each message block 402a-d, resulting in the message blocks 404a-d, and calculate the XOR sum 407a of the outputs 404a-d of the permutations.

Step 4: Repeat step 3 y times, preferably using different permutations, resulting in the message blocks 405a-d through 406a-d and the corresponding XOR sums 407a-d. An optimal choice of y may depend on the message size and/or the error rate of the transmission channel.

Step 5: Concatenate all the different XOR sums 407a-c into one hash value q 408.

The steps 1-5 may be repeated once or several times with the hash value 408 as input and with a new set of permutations, preferably with a smaller value of y, in order to generate a small hash sequence while providing a strong forgery protection.

Finally, the resulting hash value may be encrypted by taking for example the XOR sum with the output of a pseudo-random function. Then the hash value, possibly encrypted, is the streaming MAC tag of the message m.

In the following, still referring to FIG. 4, the steps of the MAC method according to an embodiment of the invention will be described in more detail.

In the following description, the following notation is used:

| | |
|---|---|
| k | secret key value. |
| m | message to be authenticated. |
| z | authentication information or message tag. |
| $t_2$ | a threshold design integer value. |
| q | intermediate hash value. |
| n | binary length of the message m. |
| L | block size of message blocks. |
| l | the number of message blocks, $l = \lceil n/L \rceil$. |
| y | the number of concatenated hashes. |
| r | the size of the sequences used for padding. |

Let a and b be indices labelling the repetitions of step 3 above and the message blocks, respectively, i.e. $1 \leq a \leq y$ and $1 \leq b \leq 1$. Denote by k a secret key value. Let $P_{k,(a,b)}(x)$ be a permutation that takes as input a binary sequence x of length L and as output a permuted sequence of x. We assume that $P_{K,(a,b)}$ is completely determined by the secret key K and the indices a,b. Preferably, given any (a,b), $P_{k,(a,b)}$ is selected uniformly distributed over all possible permutations on the set $\{1,2, \ldots ,L\}$. This is an advantage, because, given a series of R permutations, $$P_{k,(a,b)_1}, P_{k,(a,b)_2}, \ldots, P_{k,(a,b)_R},$$

for any $(a,b) \notin \{(a,b)_1, (a,b)_2, \ldots ,(a,b)_R\}$, it is computationally infeasible to extract information about $P_{K,(a,b)}$ from the above series of permutations, if one does not have knowledge about the key k.

Initially, let a=1.

Step 1: Let m be the message 401 to be protected, where m may be a message in a sequence of messages. Assume that m is represented as a binary sequence, $m=m_1,m_2, \ldots ,m_n$. Let e be the remainder of an integer division of n with L. Concatenate m and a binary all zero sequence $0=0,0, \ldots 0$ of length e into a new message sequence m'=m,0 the length of which is an integer multiple of L, i.e. 1*L=n+e. It is understood that instead of the binary all zero sequence 0 any other bit sequence of length e may be used. In the example of FIG. 4, e=0. Divide the message sequence m,0 into blocks 401a-401d of size L, i.e., $m=m_1,m_2, \ldots ,m_L,m_{L+1}, m_{L+2}, \ldots ,m_{2L},m_{2L+1}, \ldots ,m_{L\cdot(l-1)}, \ldots , m_n,0,0, \ldots , 0=m_{11},m_{12}, \ldots ,m_{1l},m_{21},m_{22}, \ldots ,m_{2L}, \ldots ,m_{l1}, m_{12}, \ldots ,m_{lL}=m'_1,m'_2, \ldots ,m'_l$.

Alternatively, other methods of dividing the message m into blocks may be used. For example, bits from predetermined positions of m may be concatenated into a block.

Step 2: Now, let $b_i=b_{i1},b_{i2}, \ldots ,b_{ir}$, $i=1, \ldots ,l$ be a set of l predetermined binary sequences of length r. Replace m with $v=M'_1,b_1,m'_2,b_2, \ldots ,m'_l,b_l$. The blocks $m'_1,b_1, m'_2, b_2, \ldots ,m'_l,b_l$ are illustrated as blocks 402a-402d in FIG. 4. For example, all $b_i$ may be chosen to be a binary all zero sequence of length r. In a preferred embodiment, r may be chosen to be equal to $t_2$.

Step 3: Calculate $$q_a = P_{k,(a,1)}(v_1) \oplus (P_{k,(a,2)}(v_2) \oplus \ldots \oplus P_{k,(a,l)}(v_l)$$

Step 4: If a<y then let a=a+1 and go to Step 3, else continue with Step 5.

Step 5: Generate $q=q_1, q_2, \ldots ,q_y$, i.e. a concatenation 508 of the XOR sums 407a-407c calculated in step 3.

Step 6: Let PRF(k) be a binary sequence of a size equal to the size of q. Preferably, PRF is a cryptographic secure pseudo-random function. Let $z=PRF(K) \oplus q$.

Step 7: The transmitter sends (m,z) over the channel. The receiver receives a pair (m',z'). The receiver calculates the tag z" of m' according to Step 1-6. If the distance d(z',z") $<y \cdot t_2$, the message is accepted, otherwise it is rejected. Preferably, the distance function d is the distance function $\delta$ described in connection with FIGS. 3a-b. Alternatively, another distance function may be used, e.g. the Hamming distance or a distance function based on the Hamming distance. Furthermore, the threshold $y \cdot t_2$ may be replaced by a different threshold.

If m is the i-th message in a sequence of messages, PRF may be chosen to be seeded by k and the index i, i.e. PRF(k,i).

It is understood that the PRF encryption may be replaced with a different encryption function.

The steps 1-5 may be repeated one or more times before continuing with step 6, each time using the calculated hash value q as an input m of the next iteration and, preferably, using a different set of permutations in each iteration. Preferably, y is decreased in subsequent iterations in order to generate a hash value of a small size. The hash value q of the last iteration is then used in step 6.

It is understood that, instead of calculating the XOR sum of the permutations in step 3, the partial hash values $q_a$ may be calculated according to different rules. For example $q_a$ may be calculated recursively as:

$$q_a P_{k,(a,1)}(\ldots (P_{k,(a,2)}(v_1) \oplus v_2) \oplus \ldots ) \oplus_3 u_1).$$

Furthermore, the order of the blocks v may be changed.

In the following, the method according to the embodiment described in connection with FIG. 4 will be further illustrated by an example:

Consider a message represented as a binary sequence m=1011 1111 0001, and consider the following parameters:

$$t_1=1, r=t_2=2, n=12, L=2, l=6, y=2$$

With these parameters y·l=12 different permutations on the set with r+L=4 elements are needed. The permutation may be chosen at random or according to a different selection rule. Furthermore, the permutations may be part of the key. In this example the permutations are assumed to be as follows:

$$P_{K,(1,1)}=\{1,2,4,3\}, P_{K,(1,2)}=\{4,1,3,2\}, P_{K,(1,3)}=\{1,4,2,3\}, P_{K,(1,4)}=\{1,3,4,2\}, P_{K,(1,5)}=\{1,2,3,4\}, P_{K,(1,6)}=\{1,3,4,2\}.$$

$P_{K,(2,1)}=\{4,1,2,3\}$, $P_{K,(2,2)}=\{3,1,4,2\}$, $P_{K,(2,3)}=\{3,4,2,1\}$, $P_{K,(2,4)}=\{2,4,1,3\}$, $P_{K,(2,5)}=\{1, 4,2,3\}$, $P_{K,(2,6)}=\{3,1,4,2\}$.

Furthermore, assume that m is the first message in a sequence and that PRF(K,1)=1101 0011.

Below it is shown how to calculate z:

a=1.

Step 1: m is an even multiple of 2 and, therefore, it is not necessary to pad any new bits to it (e=0).
Step 2: v=1000 1100 1100 1100 0000 0100.
Step 3:

$q1=P_{K,(1,1)}(1000) \oplus P_{K,(1,2)}(1100) \oplus P_{K,(1,3)}(1100)$
$\oplus P_{K,(1,4)}(1100) \oplus P_{K,(1,5)}(0000) \oplus P_{K,(1,6)}(0100)=$
$1000 \oplus 0101 \oplus 1010 \oplus 1001 \oplus 0000 \oplus 0001 = 1111$.

Step 4: a=2. Go to Step 3.
Step 3:

$q2=P_{K,(2,1)}(1000) \oplus P_{K,(2,2)}(1100) \oplus P_{K,(2,3)}(1100)$
$\oplus P_{K,(2,4)}(1100) \oplus P_{K,(2,5)}(0000) \oplus P_{K,(2,6)}(0100)=$
$0100 \oplus 0101 \oplus 0011 \oplus 1010 \oplus 0000 \oplus 0001 = 1001$.

Step 4: a=2, Continue with Step 5.
Step 5: q=1111 1001.
Step 6: z=PRF(K,1)⊕q=1101 0011⊕1111 1001=0010 1010.
Step 7: Send (m,z)=(1011 1111 0001, 0010 1010).

It is noted that it is possible to show that an adversary who tries to replace m with m', where h(m,m')>1, succeeds with a probability that is less than $(5/8)^2$.

Figure 5:
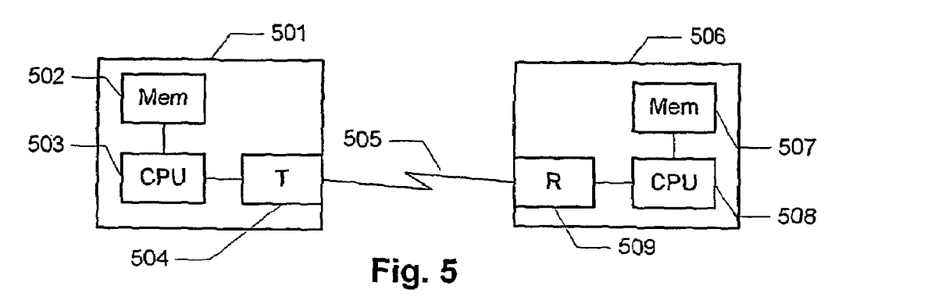
FIG. 5 shows a block diagram of a communications system according to an embodiment of the invention.

FIG. 5 shows a block diagram of a communications system according to an embodiment of the invention. The system comprises a transmitter 501 and a receiver 506 which communicate via a transmission channel 505. The transmitter comprises a processing unit 503 which is connected to a storage medium 502 and a transmitter unit 504. The receiver 506 comprises a processing unit 508 which is connected to a storage medium 507 and a receiver unit 509.

On the storage medium 502 of the transmitter 501, computer-executable code is stored which, when loaded in the processing unit 503, is adapted to implement a MAC algorithm according to the invention. Furthermore, relevant parameters for the MAC algorithm, such as a secret key, threshold values, block lengths, etc., are also stored on the storage medium 502. The message payload to be transmitted may also be stored on the storage medium 502. The communication between the transmitter 501 and the receiver 506 may, for example, be implemented as a layered protocol stack, e.g. according to the OSI model. At the transmitter, one of the layers of the protocol stack may include an implementation of the MAC algorithm according to the invention, where the MAC algorithm receives a message payload from a higher layer, and the resulting tag value is combined with the message payload and sent to a lower layer of the layered protocol stack which initiates the transmission of the message via the transmitter unit 504. At the receiver the message is received by the receiver unit 509 and processed by the lowest layers of the protocol stack at the receiver. The received message is routed to the processor 508. On the storage medium 507 computer-executable code is stored which is adapted to implement the corresponding MAC algorithm at the receiver 506 when loaded in the processing unit 508. Furthermore, the corresponding parameters for the MAC algorithm are also stored on the storage medium 503. The message payload and the received tag value are forwarded to the MAC program module executed on the processor 508. Based on the comparison of tag values, the received message may either be passed to a higher layer of the protocol stack or a re-transmission of the message may be initiated. Furthermore, the message may be stored on the storage medium 507.

The storage media may include magnetic tape, optical disc, digital video disk (DVD), compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), ferromagnetic memory, optical storage, charge coupled devices, smart cards, etc.

The processing units may include a microprocessor, an application-specific integrated circuit, or another integrated circuit, a smart card, or the like.

Figure 6A:
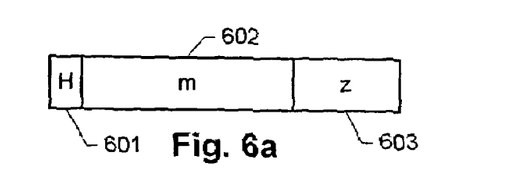
FIGS. 6a-c show examples of message formats according to embodiments of the invention.

FIG. 6a shows a first example of a message format according to an embodiment of the invention. The message comprises a header 601 comprising information such as routing information, information about the length of the following message, information about whether authentication is to be applied, sender identification, etc. The message further comprises a message body 602 comprising the information to be transmitted and the tag value 603 calculated according to a MAC function according to the invention.

Figure 6B:
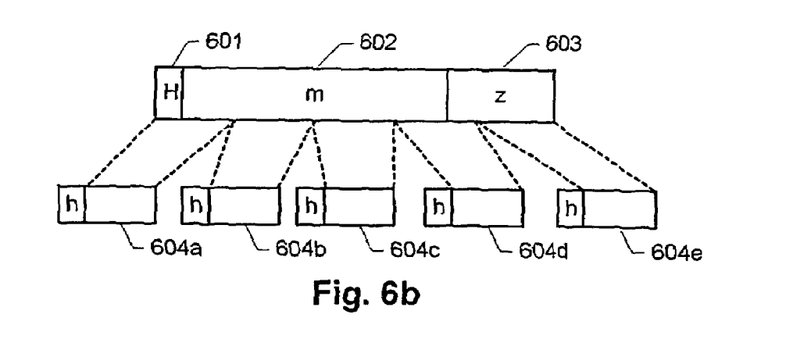

FIG. 6b shows a second example of a message format according to an embodiment of the invention. According to this example, the message, comprising a header 601, a message body 602 and a tag value 603, is divided into smaller data packets 604a-e. The division into the packets 604a-e may, for example, be performed by a lower layer of a protocol stack at the transmitter, and each of the packets 604a-e may include header information according to the communications protocol used. At the receiver, the message 602 and the tag value 603 are reconstructed from the received smaller messages 404a-e before the authentication check is performed.

Figure 6C:
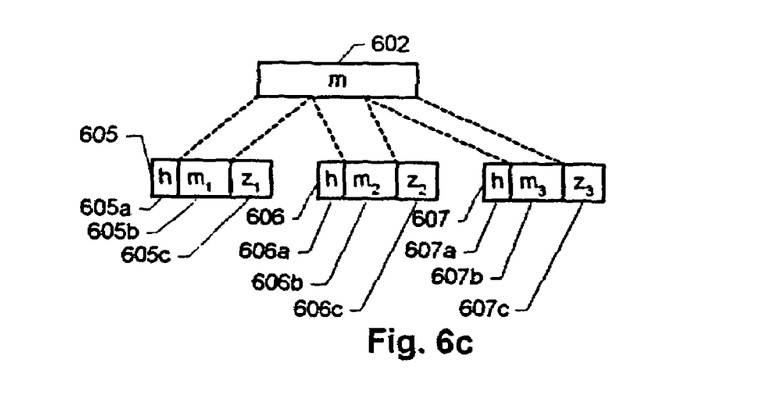

FIG. 6c shows a third example of a message format according to an embodiment of the invention. According to this example, the message body 602 is divided into smaller messages 605b, 606b, and 607b, and respective tag values 605c, 606c, and 607c are calculated for each of the smaller messages 605b, 606b, and 607b. Subsequently, the messages 605-607, each message comprising respective header information 605a, 606a, 607a, respectively, message bodies 605b, 606b, 607b, respectively, and tag values 605c, 606c, 607c, respectively, are sent to the receiver. At the receiver, the authentication check is performed for each of the messages 605-607 prior to the reconstruction of the message 602 from the message bodies, 605b, 606b, and 607b.

It is understood that other message formats may also be used within the scope of the invention. For example, the tag value may be combined with the message body in a different way, e.g. by prepending the tag value or placing it at predetermined positions within the message body. Furthermore, depending on the transmission protocol used, other ways of splitting up the message and/or including header information may be used, including the use of no header information or the sending of the tag value and the message body separately.

The invention claimed is:

1. A method of authenticating data, the method comprising the steps of:
receiving a message and a corresponding first data item generated according to a first predetermined rule;

generating a second data item according to a second predetermined rule on the basis of the received message;
calculating a first distance between the received first data item and the generated second data item;
comparing the calculated first distance with a predetermined distance; and
processing the message by accepting the message if the calculated first distance is smaller than the predetermined distance value wherein the step of processing the message includes:
  generating a first sequence of message sections from the message, each message section having a predetermined length;
  modifying at least a first message section of the sequence of message sections;
  applying at least a first permutation to at least the modified first message section of the sequence of message sections;
  calculating at least one XOR sum of a result of at least the first permutation; and
  calculating a hash value from the calculated at least one XOR sum.

2. A method according to claim 1, wherein the message and the first data item are received via a wireless communications channel.

3. A method according to claim 2, wherein the step of generating the second data item comprises the step of applying a predetermined permutation to a third data item derived from the message.

4. A method according to claim 3, wherein the step of generating the second data item comprises the step of combining a fourth data item derived from the message with a predetermined fifth data item.

5. A method according to claims 4, wherein the step of combining a fourth data item derived from the message with a predetermined fifth data item comprises the step of inserting predetermined binary sequences at predetermined positions of the fourth data item.

6. A method according to claim 5, wherein the step of calculating a first distance comprises the step of calculating a Hamming distance.

7. A method according to claim 1, wherein the method further comprises the step of repeating the steps of applying at least the first permutation and calculating an XOR sum a predetermined number of times.

8. A method according to claim 1, wherein the method further comprises the step of repeating the steps of processing the message using at least a second permutation.

9. A method according to claim 8, wherein the method further comprises the step of encrypting the calculated hash value.

10. A method according to claim 9, wherein the step of calculating the first distance further comprises the steps of:
  dividing the first and second data items into corresponding first and second sets of data sections;
  calculating a second distance between a first section of the first set of sections and a corresponding second section of the second set of sections; and
  comparing the second distance with a predetermined threshold value.

11. A method according to claim 10, wherein:
the first data item is further generated on the basis of a first secret key code; and
the step of generating the second data item on the basis of the received message further comprises the step of generating the second data item on the basis of a second secret key code.

12. A method according to claim 11, wherein:
the first and second secret key codes are the same key code; and
the first and second predetermined rules are the same rule.

13. A communications system comprising:
first processing means adapted to calculate a first data item according to a first predetermined rule on the basis of a message;
a transmitter adapted to transmit the message and the generated first data item via a transmission channel;
a receiver adapted to receive the transmitted message and the transmitted first data item;
second processing means adapted to:
  generate a second data item according to a second predetermined rule on the basis of the received message;
  calculate a first distance between the received first data item and the generated second data item; and
  compare the calculated first distance with a predetermined distance value; and
third processing means for processing the message and adapted to:
  generating a first sequence of message sections from the message, each message section having a predetermined length;
  modifying at least a first message section of the sequence of message sections;
  applying at least a first permutation to at least the modified first message section of the sequence of message sections;
  calculating at least one XOR sum of a result of at least the first permutation; and
  calculating a hash value from the calculated at least one XOR sum.

14. An apparatus comprising:
a receiver adapted to receive a message and a corresponding first data item generated according to a first predetermined rule;
first processing means adapted to:
  generate a second data item according to a second predetermined rule on the basis of the received message;
  calculate a first distance between the received first data item and the generated second data item; and
  compare the calculated first distance with a predetermined distance value; and
second processing means for processing the message and adapted to:
  generating a first sequence of message sections from the message, each message section having a predetermined length;
  modifying at least a first message section of the sequence of message sections;
  applying at least a first permutation to at least the modified first message section of the sequence of message sections;
  calculating at least one XOR sum of a result of at least the first permutation; and
  calculating a hash value from the calculated at least one XOR sum.

15. An apparatus according to claim 14, wherein the apparatus is a mobile radio terminal.

* * * * *

UNITED STATES PATENT AND TRADEMARK OFFICE
CERTIFICATE OF CORRECTION

PATENT NO. : 7,298,840 B2
APPLICATION NO. : 10/476138
DATED : November 20, 2007
INVENTOR(S) : Gehrmann et al.

It is certified that error appears in the above-identified patent and that said Letters Patent is hereby corrected as shown below:

In Column 8, Line 8, delete "z'" and insert -- z" --, therefor.

In Column 8, Line 9, delete "$d_2$" and insert -- $d_2 =$ --, therefor.

In Column 9, Line 2, delete "$Z_2, Z_3, \ldots, Z_y.$" and insert -- $z_2, z_3, \ldots, z_y.$ --, therefor.

In Column 9, Line 4, delete "$Z' \in Z,$" and insert -- $z' \in Z,$ --, therefor.

In Column 9, Line 41, delete "z'" and insert -- z" --, therefor.

In Column 9, Line 45, delete "6" and insert -- $\delta$ --, therefor.

In Column 10, Line 14, delete "m $m_1$," and insert -- m = $m_1$, --, therefor.

In Column 10, Line 42, delete "$m_{22}$" and insert -- $m'_{22}$ --, therefor.

In Column 11, Line 47, delete "$P_{k(a,b)2}$," and insert -- $P_{k,(a,b)2}$ --, therefor.

In Column 12, Line 6, delete "$M'_1$" and insert -- $m'_1$ --, therefor.

In Column 12, Line 13, delete " $q_a = P_{k,(a,1)}(v_1) \oplus (P_{k,(a,2)}(v_2) \oplus \ldots \oplus P_{k(a,I)}(v_I)$ ,"

and insert -- $q_a = P_{k,(a,1)}(v_1) \oplus P_{k,(a,2)}(v_2) \oplus \ldots \oplus P_{k,(a,I)}(v_I)$ --, therefor.

In Column 12, Line 45, delete "q," and insert -- $q_a$ --, therefor.

In Column 12, Line 49, delete " $q_a P_{k,(a,1)}(\ldots(P_{k,(a,2)}(v_1) \oplus v_2) \oplus \ldots) \oplus_3 u_1).$ ,"

and insert -- $q_a = P_{k,(a,1)}(\ldots(P_{k,(a,3)}(P_{k,(a,1)}(v_1) \oplus v_2) \oplus \ldots) \oplus_3 u_1).$ --, therefor.

In Column 12, Lines 65-67, delete " $P_{K,(1,1)}=\{1,2,4,3\}, P_{K,(1,2)}=\{4,1,3,2\}, P_{K,(1,3)}=\{1,4,2,3\}, P_{K,(1,4)}=\{1,3,4,2\}, P_{K,(1,5)}=\{1,2,3,4\}, P_{K,(1,6)}=\{1,3,4,2\}.$ " and insert -- $P_{K,(1,1)}=\{1,2,4,3\}, P_{K,(1,2)}=\{4,1,3,2\}, P_{K,(1,3)}=\{1,4,2,3\},$ --, therefor. $P_{K,(1,4)}=\{1,3,4,2\}, P_{K,(1,5)}=\{1,2,3,4\}, P_{K,(1,6)}=\{1,3,4,2\}.$

UNITED STATES PATENT AND TRADEMARK OFFICE
CERTIFICATE OF CORRECTION

PATENT NO. : 7,298,840 B2
APPLICATION NO. : 10/476138
DATED : November 20, 2007
INVENTOR(S) : Gehrmann et al.

It is certified that error appears in the above-identified patent and that said Letters Patent is hereby corrected as shown below:

In Column 13, Line 2, delete "{1, 4,2,3} and insert -- {1,4,2,3} --, therefor.

In Column 13, Line 13, delete "$P_{K(1,1)}$" and insert -- $P_{K,(1,1)}$ --, therefor.

In Column 15, Line 7, in Claim 1, delete "distance;" and insert -- distance value; --, therefor.

Signed and Sealed this

Tenth Day of March, 2009

JOHN DOLL
*Acting Director of the United States Patent and Trademark Office*